(12) United States Patent
Boland et al.

(10) Patent No.: US 7,069,002 B2
(45) Date of Patent: Jun. 27, 2006

(54) MESSAGE WAITING INDICATION OPERABLE TO OVERCOME A BORDER CONDITION BETWEEN MOBILE SWITCHING CENTERS

(75) Inventors: Richard R. Boland, LaGrange, IL (US); Mark Alan McCormick, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 156 days.

(21) Appl. No.: 10/719,859

(22) Filed: Nov. 20, 2003

(65) Prior Publication Data

US 2004/0266400 A1    Dec. 30, 2004

Related U.S. Application Data

(63) Continuation-in-part of application No. 10/610,174, filed on Jun. 30, 2003.

(51) Int. Cl.
*H04M 3/16*    (2006.01)
(52) U.S. Cl. ............... 455/412.2; 455/412.1; 455/433; 340/7.38; 340/7.22
(58) Field of Classification Search ............ 455/412.2, 455/412.1, 433; 340/7.38, 7.22
See application file for complete search history.

(56) References Cited

U.S. PATENT DOCUMENTS

| | | | |
|---|---|---|---|
| 5,664,009 A * | 9/1997 | Hurst et al. ............. 379/88.22 |
| 5,797,094 A * | 8/1998 | Houde et al. ............ 455/412.2 |
| 6,014,559 A | 1/2000 | Amin |
| 6,032,043 A | 2/2000 | Houde |
| 6,055,423 A | 4/2000 | Calabrese et al. |
| 6,073,015 A | 6/2000 | Berggren et al. |
| 6,178,322 B1 | 1/2001 | Cresch |
| 6,282,416 B1 | 8/2001 | Verdonk |
| 6,285,880 B1 | 9/2001 | Gagnon et al. |
| 6,333,973 B1 | 12/2001 | Smith et al. |
| 6,453,164 B1 * | 9/2002 | Fuller et al. ................. 455/445 |
| 6,751,456 B1 * | 6/2004 | Bilgic ........................ 455/418 |
| 6,775,255 B1 | 8/2004 | Roy |
| 2002/0006782 A1 | 1/2002 | Kim |
| 2002/0101964 A1 | 8/2002 | Contractor |
| 2002/0137500 A1 | 9/2002 | Brooking et al. |
| 2003/0224789 A1 | 12/2003 | Adamany et al. |
| 2004/0203763 A1 | 10/2004 | Tammi |
| 2004/0224706 A1 * | 11/2004 | Lorello et al. ............. 455/466 |
| 2005/0107086 A1 | 5/2005 | Tell et al. |

* cited by examiner

*Primary Examiner*—Danh Cong Le

(57) ABSTRACT

There is therefore a need to forward the message waiting indication data to Mobile Switching Centers whose service areas overlap with the service area of the Mobile Switching Center presently serving this mobile subscriber's wireless communication device. In this manner, any one of these Mobile Switching Centers can update the mobile subscriber with regard to message waiting indications. This is accomplished by the use of the ISPAGE message which is used to forward the message waiting indication data to Mobile Switching Centers whose service areas overlap with the service area of the Mobile Switching Center presently serving this mobile subscriber's wireless communication device.

16 Claims, 5 Drawing Sheets

MESSAGE WAITING INDICATION OPERABLE TO OVERCOME A BORDER CONDITION BETWEEN MOBILE SWITCHING CENTERS

CROSS-REFERENCE TO RELATED APPLICATIONS

This application is a continuation-in-part of U.S. patent application Ser. No. 10/610,174, filed Jun. 30, 2003 and titled "System For Providing Message Waiting Indication Updates In A Cellular Communication Network".

FIELD OF THE INVENTION

This invention relates to cellular communications networks and, in particular, to a feature operable therein to provide subscribers with an updated message waiting indication when they encounter a border condition between Mobile Switching Centers.

PROBLEM

It is a problem in the field of cellular communication networks to enable a mobile subscriber to receive an updated message waiting indication when they encounter a border condition between Mobile Switching Centers.

In existing cellular communication networks, service providers are frequently unable to provide the mobile subscribers with an accurate indication of either the presence or the absence of messages that are queued in the mobile subscribers' voice mailbox. This problem is most commonly encountered in the case of a border service area, which is the location where the service area of a first Mobile Switching Center overlaps the service area of a second Mobile Switching Center. This situation occurs because the cell site radio frequency signals transmitted by the various base station subsystems served by the Mobile Switching Centers are not precisely bounded and to provide continuity of service to the mobile subscribers, the radio frequency signals from one base station subsystem must overlap with the radio frequency signals from an adjacent base station subsystem. Therefore, the mobile subscribers' wireless communication devices are designed to select the base station subsystem originating the strongest signal to ensure reliable communications as the mobile subscriber roams among multiple cell sites.

In this environment, when the mobile subscriber's movements cause the mobile subscriber's wireless communication device to switch among cell sites on a frequent basis (termed "border condition" herein), the mobile subscriber is not provided with accurate message waiting indications. This is due to the fact that when the subscriber roams among multiple cell sites served by different Mobile Switching Centers, the mobile subscriber's wireless communication device must perform an Autonomous Registration with the new Mobile Switching Center, each time the mobile subscriber traverses the border between the service areas of adjacent Mobile Switching Centers. The mobile subscriber is unaware of this process and it represents a cellular communication network administrative process that is required to accurately record the present location of the mobile subscriber wireless communication device in the cellular communication network for call routing purposes, and to provide the mobile subscriber with the set of features for which they are enrolled.

However, each time the mobile subscriber wireless communication device roams to the coverage area of another Mobile Switching Center and performs either an autonomous registration or a call origination/termination, the new serving Mobile Switching Center must access the mobile subscriber's Home Location Register to obtain subscriber information to authorize the provision of service to this mobile subscriber. As part of this process, the mobile subscriber's Home Location Register does not transmit the message waiting information, indicative of the number of messages waiting for retrieval by the subscriber at the mobile subscriber wireless communication device, to the new serving Mobile Switching Center. The new serving Mobile Switching Center is unaware of the presence of unread messages.

This problem is most serious in a highly congested cellular communication network where there are many border cells. In this environment, when the call handling capacity of a base station subsystem is reached, an additional base station subsystem is added to the Mobile Switching Center to provide the necessary call handling capacity. However, when the call handling capacity of a Mobile Switching Center is reached, the coverage area of the Mobile Switching Center is reduced and a new Mobile Switching Center is installed, thereby creating more border cells. With the increased subscriber population and longer holding times on calls due to new media-based applications, this problem is becoming more prevalent.

SOLUTION

The above described problems are solved and a technical advance achieved by the present message waiting indication operable to overcome a border condition between mobile switching centers (termed "message waiting indication update feature" herein).

The message waiting indication update feature comprises a number of processes that execute in the various Mobile Switching Centers of the cellular communication network and functions to use the Inter-System Page (ISPAGE) message to enable the exchange of message waiting indication information between the Home Location Register, the serving Mobile Switching Center and the mobile subscriber wireless communication devices served by the mobile Switching Centers. In particular, the serving Mobile Switching Center, upon receipt of a message waiting acknowledgement from the mobile subscriber wireless communication device, updates the local copy of the subscriber's data in the Visited Location Register and forwards this information to the subscriber's Home Location Register via a message, such as an ANSI-41 Registration Indication return result, with the qualification information code being set to NO INFO (or Registration Cancellation return result) and the number of the messages in the message waiting queue being acknowledged. The Home Location Register stores this received data in the subscriber's Home Location Register entry for use when the next successive Registration Indication is received from a new serving Mobile Switching Center or in response to the subscriber initiating a local access.

When the serving Mobile Switching Center receives a Registration Indication message return result from the subscriber's Home Location Register to update the subscriber's information and the message waiting indication count is the same as the count previously sent to the Home Location Register, the serving Mobile Switching Center does not have to transmit a message waiting indication over the forward control channel to the mobile subscriber wireless communication device, thus reducing the message traffic on the forward control channel.

When a mobile subscriber's wireless communication device registers with a Mobile Switching Center in the cellular communication network, the mobile subscriber may have messages queued in their voice messaging system. When this occurs, the serving Mobile Switching Center provides data to the mobile subscriber's wireless communication device via the radio frequency communication link to indicate the number of messages waiting for the mobile subscriber. However, the mobile subscriber may not receive this information because in the interim they have roamed into the coverage area of another Mobile Switching Center, where a base station subsystem served by that Mobile Switching Center has the strongest signal. The mobile subscriber's wireless communication device may be locking on to this signal or have already locked on to this signal. There is therefore a need to forward the message waiting indication data to Mobile Switching Centers whose service areas overlap with the service area of the Mobile Switching Center presently serving this mobile subscriber's wireless communication device. In this manner, any one of these Mobile Switching Centers can update the mobile subscriber with regard to message waiting indications, even though that updating Mobile Switching Center does not presently handle the communication connection with the mobile subscriber's wireless communication device.

This is accomplished by the use of the ISPAGE message which is used to forward the message waiting indication data to Mobile Switching Centers whose service areas overlap with the service area of the Mobile Switching Center presently serving this mobile subscriber's wireless communication device.

DETAILED DESCRIPTION

Figure 1:
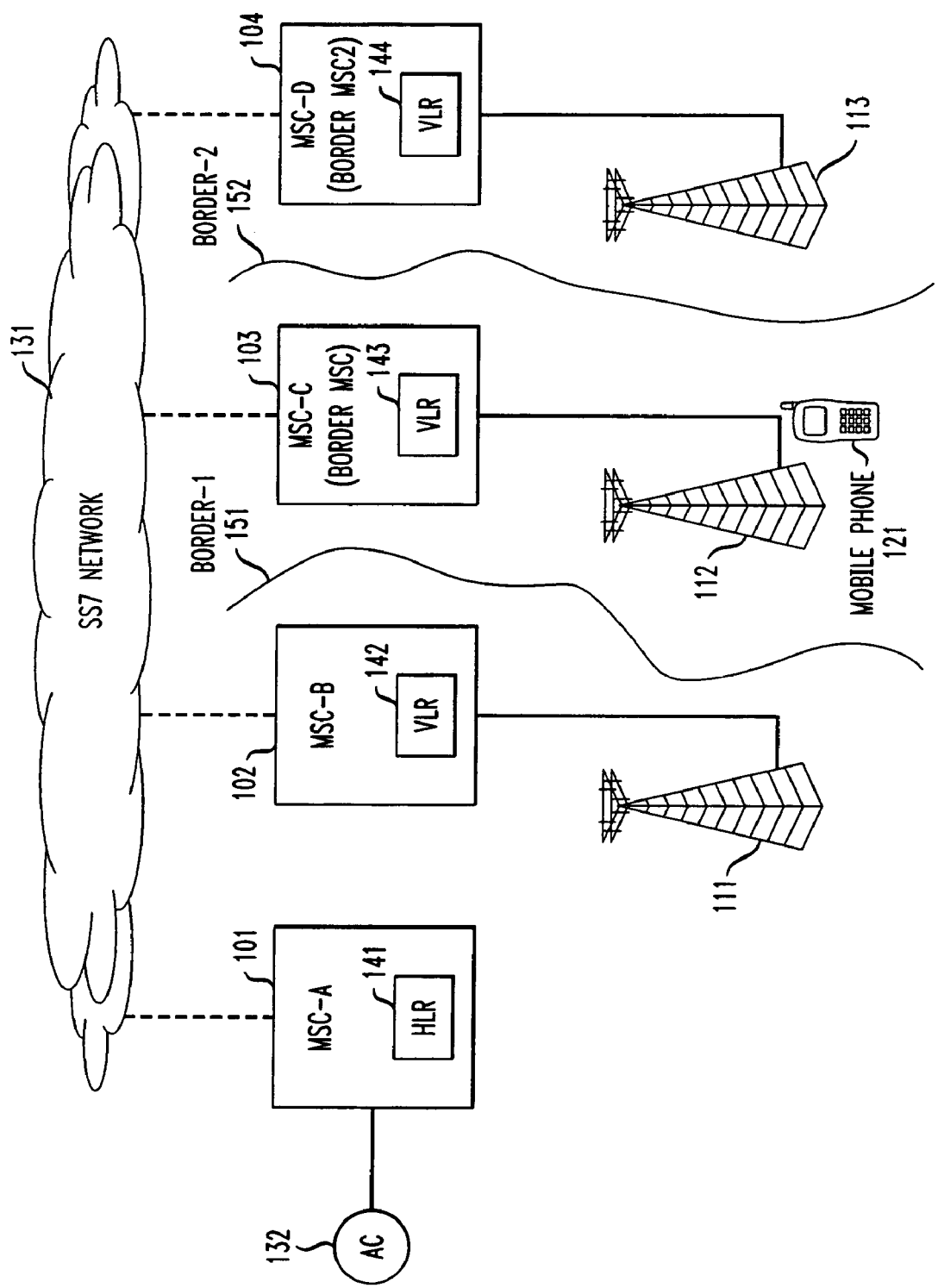
FIG. 1 illustrates in block diagram form the configuration of a typical cellular communication network that has a border service area between multiple adjacent Mobile Switching Centers.

FIG. 1 illustrates in block diagram form the configuration of a typical cellular communication network that has a border service area between multiple adjacent Mobile Switching Centers. A cellular communication network 100 consists of a plurality of Mobile Switching Centers 101–104, each of which serves one or more base station subsystems (such as 111, 112, 113) that provide the radio frequency links to the plurality of mobile subscriber wireless communication devices 121 that are operational in each call coverage area (termed cell) (not shown) provided by the associated base station subsystem. One Mobile Switching Center 101 is typically termed the subscriber's home Mobile Switching Center and it maintains the subscriber's identification, authentication and call services definition data in an associated Home Location Register 141 which works in coordination with the Home Authentication Center (AC). Other Mobile Switching Centers 102, 103, 104 maintain their own Home Location Registers (not shown) and Visited Location Registers 142, 143, 144 to store call authorization data for subscribers who roam out of their home service area to the call coverage area of the visited Mobile Switching Centers 102, 103, 104. Alternatively, the Home Location Register could be a Standalone Home Location Register SHLR thus not part of a Mobile Switching Center.

In the case of a border service area, this is the area where the service from a first Mobile Switching Center overlaps the service provided by a second Mobile Switching Center, as indicated in FIG. 1 by lines 151, 152. This situation occurs because the cell site radio frequency signals transmitted by the various base station subsystems served by the Mobile Switching Centers are not precisely bounded and to provide continuity of service to the mobile subscribers, the radio frequency signals from one base station subsystem must overlap with the radio frequency signals from an adjacent base station subsystem. Therefore, the mobile subscribers' wireless communication devices are designed to select the base station subsystem producing the strongest signal to ensure reliable communications as the subscriber roams among multiple cell sites.

In this environment, when the mobile subscriber's movements cause the mobile subscriber's wireless communication device to switch among cell sites on a frequent basis (termed "border condition" herein), the mobile subscriber is not provided with accurate message waiting indications. This is due to the fact that when the subscriber roams among multiple cell sites served by different Mobile Switching Centers, the mobile subscriber's wireless communication device must perform an Autonomous Registration with the new Mobile Switching Center, each time the mobile subscriber traverses the border between the service areas of adjacent Mobile Switching Centers. The mobile subscriber is unaware of this process and it represents a cellular communication network administrative process that is required to accurately record the present location of the mobile subscriber wireless communication device in the cellular communication network for call routing purposes, and to provide the mobile subscriber with the set of features for which they are enrolled. The presently active Mobile Switching Center must then retrieve the mobile subscriber's message waiting information.

Message Waiting Indication Processing

Figure 2:
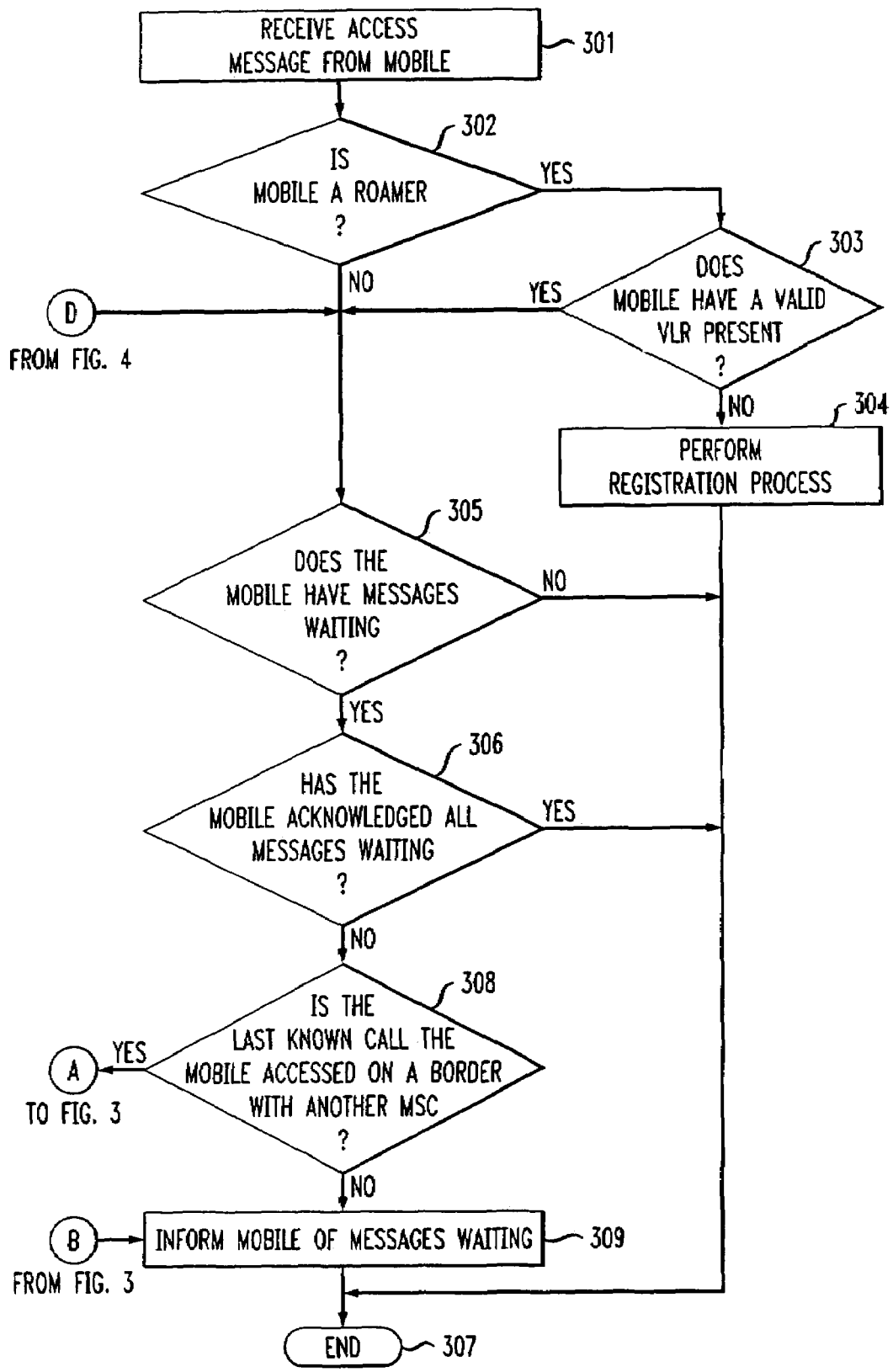
FIGS. 2–5 illustrate in flow diagram form the operation of the present message waiting indication update feature in processing message waiting indication for transmission to the mobile subscriber's wireless communication device.
Figure 3:
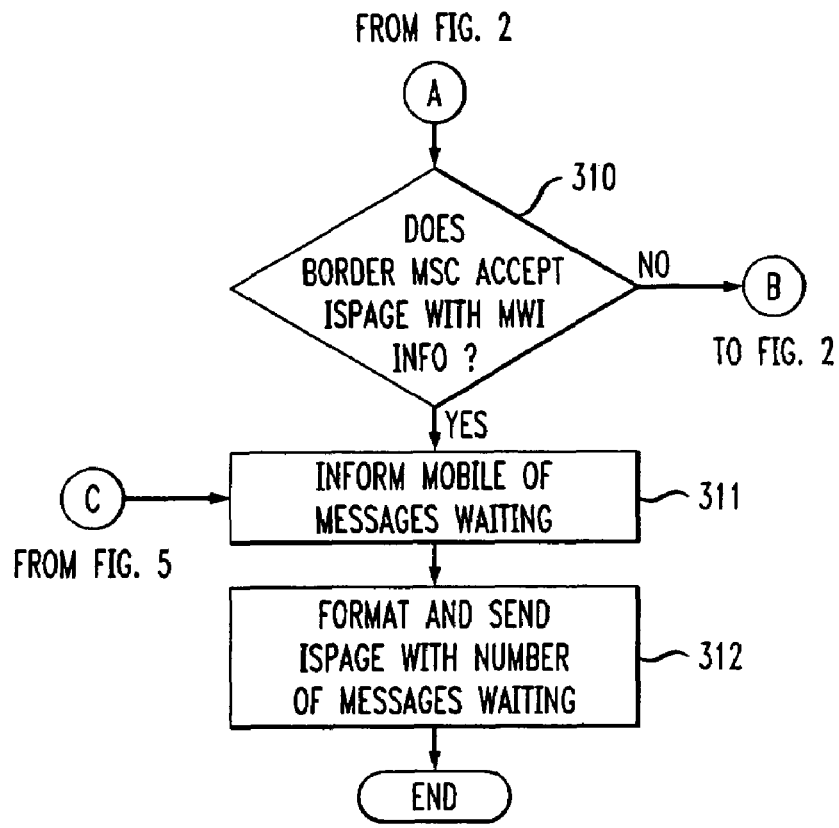
Figure 4:
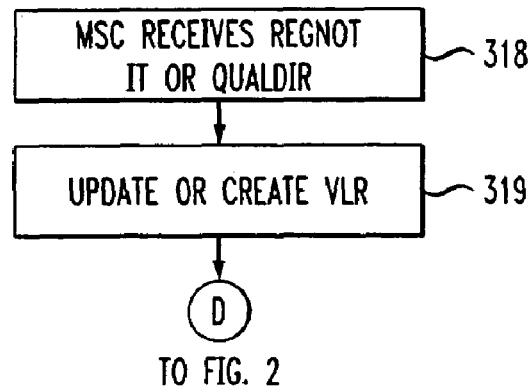
Figure 5:
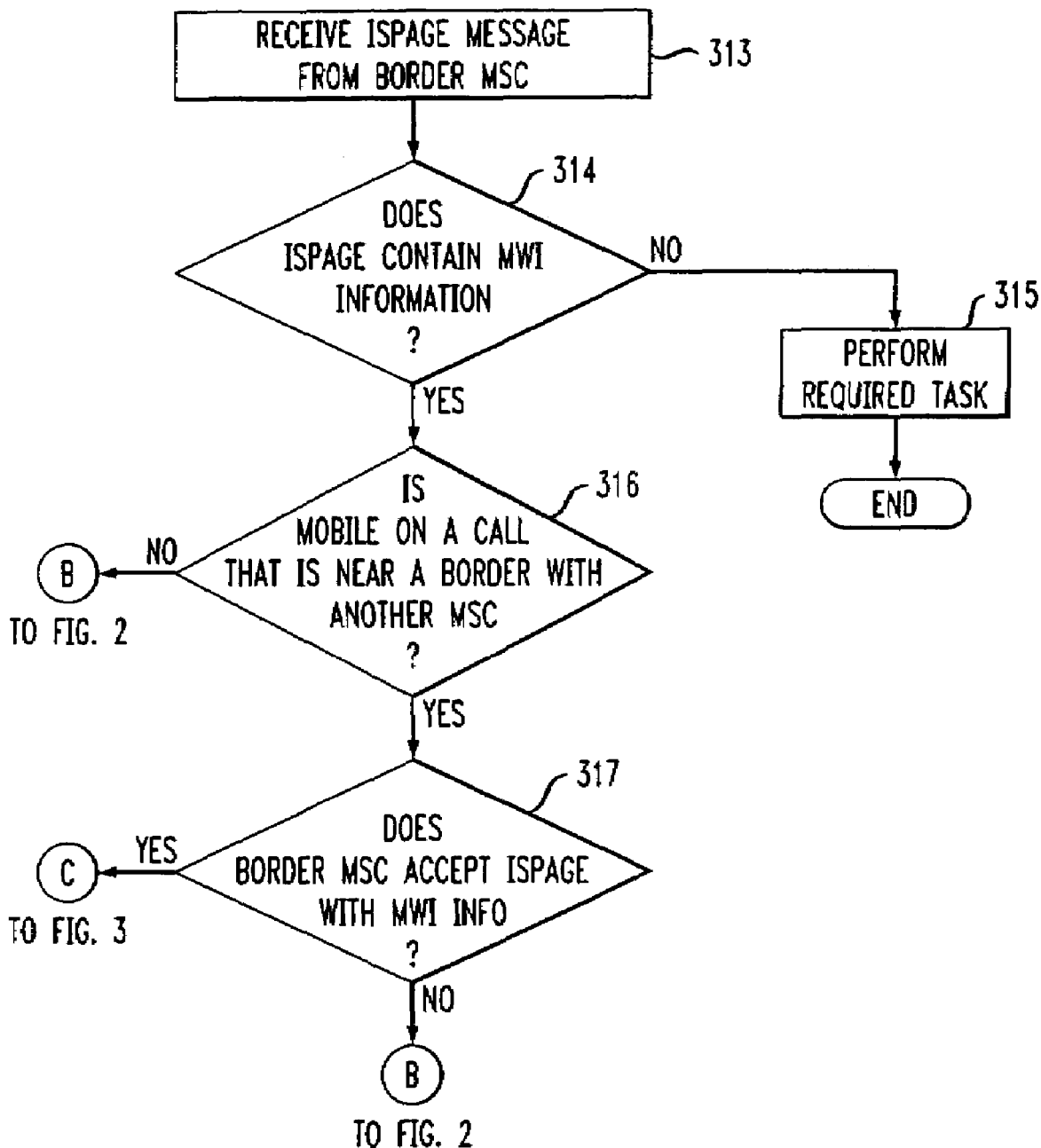

FIGS. 2 & 3 illustrate in flow diagram form, the operation of the present message waiting indication update feature in processing message waiting indication for transmission to the mobile subscriber's wireless communication device.

As illustrated in flow diagram form in FIGS. 2 & 3, in the cellular communication network 100, when a mobile subscriber wireless communication device 121 registers with a serving Mobile Switching Center 102 by transmitting a service request and the MIN/ESN of the mobile subscriber wireless communication device 121 to the serving Mobile Switching Center 102 at step 301, the serving Mobile Switching Center 102 must validate the subscriber's authorization to receive service. This is accomplished at step 302 by determining whether this mobile subscriber wireless communication device 121 is in the roaming mode. If so, processing advances to step 303 where it is determined whether this mobile subscriber wireless communication device. 121 has a valid entry in the Visited Location Register (VLR) 142 operational in the serving Mobile Switching Center 102.

If the mobile subscriber wireless communication device 121 has no valid entry in the Visited Location Register (VLR) 142 operational in the serving Mobile Switching Center 102, at step 304, the mobile subscriber wireless communication device 121 transmits a Registration Indication message to the subscriber's home Mobile Switching Center 101 to retrieve data from the subscriber's Home Location Register (HLR) 141. The subscriber's Home Location Register (HLR) 141 creates a Registration Indication Return Result message that contains the necessary subscriber service authorization data and returns a Registration Indication Return Result message to the serving Mobile Switching Center 102. The serving Mobile Switching Center 102 receives the Registration Indication Return Result message and creates an entry in the Visited Location Register 112 with the subscriber profile data contained in the Registration Indication Return Result message and processes the service request for the mobile subscriber wireless communication device 121 in well known fashion. Processing then exits at step 307.

Alternatively, at step 318, if the serving Mobile Switching Center 102 receives a Registration Indication Return message from the mobile subscriber wireless communication device 121, or a QUALDIR message, processing advances to step 319 where the serving Mobile Switching Center 102 updates the entry for this mobile subscriber wireless communication device 121 in the Visited Location Register 142 or creates a new entry in the Visited Location directory 142 is this subscriber is newly arrives in the service area of this serving Mobile Switching Center 102. Processing then advances to step 305 as described below.

If at step 303, the serving Mobile Switching Center 102 determines that there is a valid entry in the Visited Location Register 112 for this subscriber, or at step 302 that this subscriber is served by the home Mobile Switching Center, at step 304 the serving Mobile Switching Center 102 determines whether there are any messages waiting for this mobile subscriber. If not, processing exits at step 307. However, if there are messages waiting for this mobile subscriber, at step 306 it is determined whether the number of unread messages and acknowledgements identified by the subscriber's Home Location Register 111 matches the data stored in the Visited Location Register 112 for the number of unread messages acknowledged by the mobile subscriber wireless communication device 121. If there are no unacknowledged messages waiting, processing exits at step 307. If the serving Mobile Switching Center 102 determines the presence of unacknowledged unread messages, then at step 308 the serving Mobile Switching Center 102 determines whether the last cell the mobile subscriber wireless communication device accessed is on a border with another Mobile Switching Center. If not, the serving Mobile Switching Center 102 uses the forward control (paging) channel of the radio link to the mobile subscriber wireless communication device 121 to transmit this message waiting data to the mobile subscriber wireless communication device 121 at step 309 and processing exits at step 307.

If the last cell the mobile subscriber wireless communication device accessed is on a border with another Mobile Switching Center, then processing advances to step 310 where the serving Mobile Switching Center 102 determines whether the other border Mobile Switching Center accepts an ISPAGE message that contains message waiting indication information. If not, the serving Mobile Switching Center 102 uses the forward control (paging) channel of the radio link to the mobile subscriber wireless communication device 121 to transmit this message waiting data to the mobile subscriber wireless communication device 121 at step 309 and processing exits at step 307. If so, processing advances to step 311 where the serving Mobile Switching Center 102 uses the forward control (paging) channel of the radio link to the mobile subscriber wireless communication device 121 to transmit this message waiting data to the mobile subscriber wireless communication device 121 by, at step 312, formatting and transmitting an ISPAGE containing data indicative of the number of messages waiting. Processing then exits at step 307.

Mobile Switching Center Processing of an ISPAGE Message

The serving Mobile Switching Center 102, when it receives an ISPAGE message from a border Mobile Switching Center at step 313, reviews the contents of the ISPAGE message and determines at step 314 whether the ISPAGE message contains message waiting indication data. If not, the serving Mobile Switching Center 102 performs the task indicated by the received ISPAGE message and then processing exits at step 307. If the received ISPAGE message does contain message waiting indication data, the serving Mobile Switching Center 102 at step 316 determines whether the last cell the mobile subscriber wireless communication device accessed is on a border with another Mobile Switching Center. If not, the serving Mobile Switching Center 102 uses the forward control (paging) channel of the radio link to the mobile subscriber wireless communication device 121 to transmit this message waiting data to the mobile subscriber wireless communication device 121 at step 309 and processing exits at step 307.

If the last cell the mobile subscriber wireless communication device accessed is on a border with another Mobile Switching Center, then processing advances to step 317 where the serving Mobile Switching Center 102 determines whether the other border Mobile Switching Center accepts an ISPAGE message that contains message waiting indication information. If not, the serving Mobile Switching Center 102 uses the forward control (paging) channel of the radio link to the mobile subscriber wireless communication device 121 to transmit this message waiting data to the mobile subscriber wireless communication device 121 at step 309 and processing exits at step 307. If so, processing advances to step 311 where the serving Mobile Switching Center 102 uses the forward control (paging) channel of the radio link to the mobile subscriber wireless communication device 121 to transmit this message waiting data to the mobile subscriber wireless communication device 121 by, at step 312, formatting and transmitting an ISPAGE containing data indicative of the number of messages waiting. Processing then exits at step 307.

Figure 6:
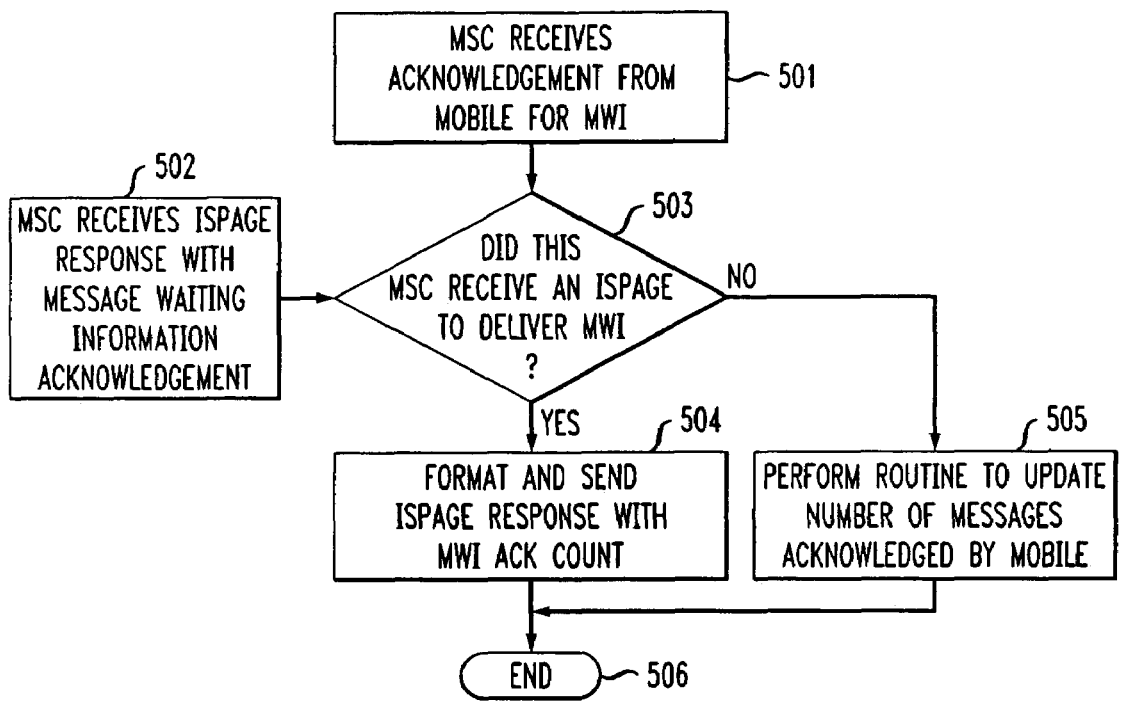
FIG. 6 illustrates in flow diagram form the operation of the present message waiting indication update feature in processing message waiting indication acknowledgement from the mobile subscriber's wireless communication device.

Mobile Switching Center Processing of Mobile Subscriber Wireless Communication Device Acknowledgement FIG. 6 illustrates in flow diagram form the operation of the present message waiting indication update feature in processing message waiting indication acknowledgement from the mobile subscriber's wireless communication device.

At step 501, the serving Mobile Switching Center 102 receives an acknowledgement from the mobile subscriber wireless communication device 121 that the message waiting indication data was received. At step 503, the serving Mobile Switching Center 102 determines whether the mobile subscriber wireless communication device 121 received an ISPAGE message to deliver this information. If not, at step 505 the subscriber's home location as determined and the subscriber's Home Location Register is updated to reflect the new number of unread messages acknowledged and processing ends at step 506. This is the existing routine for updating the data stored in the Visited Location Register 112 for the number of unread messages acknowledged by the mobile subscriber wireless communication device 121. If at step 503 it is determined that the mobile subscriber wireless communication device 121 received an ISPAGE message to deliver this information, the serving Mobile Switching Center 102 at step 504 formats and transmits an ISPAGE acknowledgement response, which contains the message waiting indication acknowledgement count to the mobile subscriber wireless communication device 121 and processing exits at step 506.

Alternatively, the message waiting indication acknowledgement process can be initiated at step 502 by the serving Mobile Switching Center 102 receiving an ISPAGE Response message, which contains an acknowledgement from the mobile subscriber wireless communication device 121 that the message waiting indication data was received.

Figure 7:
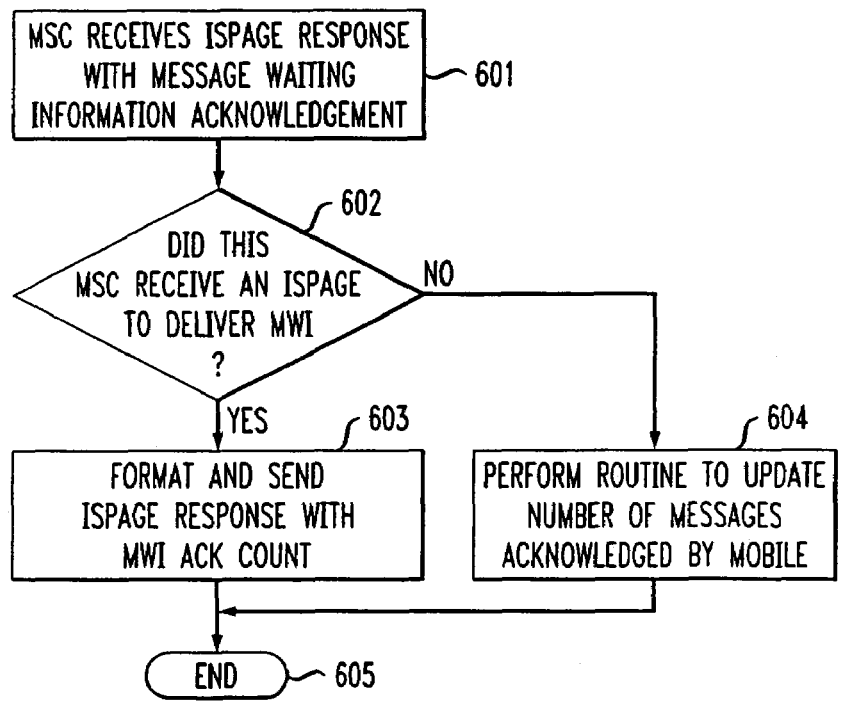
FIG. 7 illustrates in flow diagram form the operation of the present message waiting indication update feature in processing message waiting indication acknowledgement from the mobile subscriber's wireless communication device in response to the ISPAGE message.

Mobile Switching Center Processing of Mobile Subscriber Wireless Communication Device Acknowledgement in Response to ISPAGE Message FIG. 7 illustrates in flow diagram form the operation of the present message waiting indication update feature in processing message waiting indication acknowledgement from the mobile subscriber's wireless communication device in response to the ISPAGE message.

At step 601, the serving Mobile Switching Center 102 receives an ISPAGE Response message, which contains an acknowledgement from the mobile subscriber wireless communication device 121 that the message waiting indication data was received. At step 602, the serving Mobile Switching Center 102 determines whether the mobile subscriber wireless communication device 121 received an ISPAGE message to deliver this information. If not, at step 604 the subscriber's home location as determined and the subscriber's Home Location Register is updated to reflect the new number of unread messages acknowledged and processing ends at step 605. This is the existing routine for updating the data stored in the Visited Location Register 112 for the number of unread messages acknowledged by the mobile subscriber wireless communication device 121. If at step 602 it is determined that the mobile subscriber wireless communication device 121 received an ISPAGE message to deliver this information, the serving Mobile Switching Center 102 at step 603 formats and transmits an ISPAGE acknowledgement response, which contains the message waiting indication acknowledgement count to the mobile subscriber wireless communication device 121 and processing exits at step 605.

Summary

The message waiting indication update feature comprises a number of processes that execute in the various Mobile Switching Centers of the cellular communication network and functions to use the ISPAGE message to enable the exchange of message waiting indication information between the Home Location Register, the serving Mobile Switching Center and the mobile subscriber wireless communication devices served by the mobile Switching Centers. The ISPAGE message is used to forward the message waiting indication data to Mobile Switching Centers whose service areas overlap with the service area of the Mobile Switching Center presently serving this mobile subscriber's wireless communication device.

What is claimed:

1. A message waiting indication update feature, operable in a cellular communication network, for maintaining a count of the unread messages stored for a subscriber who uses a mobile subscriber wireless communication device, comprising:

Home Location Register means, associated with said subscriber's home Mobile Switching Center, for maintaining a profile for said subscriber comprising a set of data that identifies said subscriber, service authorizations for said subscriber, said data indicative of a present count of unread messages for said subscriber, and data indicative of a present count of acknowledged unread messages for said subscriber;

subscriber profile means for storing data in said Home Location Register means indicative of a present count of unread messages for said subscriber;

subscriber acknowledgement means for storing data in said Home Location Register means indicative of a present count of acknowledged unread messages for said subscriber;

border condition determining means for identifying that a cell last accessed by said mobile subscriber wireless device is on a border with a Mobile Switching Center other than the serving Mobile Switching Center;

Mobile Switching Center message indication means, responsive to the presence of unread messages in excess of those identified in said present count of acknowledged unread messages for said subscriber, for transmitting data indicative of a present count of unread messages for said subscriber to said other Mobile Switching Center; and message indication means, responsive to the presence of unread messages in excess of those identified in said present count of acknowledged unread messages for said subscriber, for transmitting data to said subscriber indicative of a present count of unread messages for said subscriber.

2. The message waiting indication update feature of claim 1 further comprising:

registration means, operable in a serving Mobile Switching Center and responsive to said subscriber initiating a registration process from a mobile subscriber wireless communication device at said serving Mobile Switching Center, for transmitting a registration request message to said Home Location Register means, associated with said subscriber's home Mobile Switching Center; and registration indication result means for transmitting said data indicative of a present count of unread messages for said subscriber, and said data indicative of a present count of acknowledged unread messages for said subscriber to said serving Mobile Switching Center.

3. The message waiting indication update feature of claim 2 further comprising:

register update means for storing said data indicative of a present count of unread messages for said subscriber, and said data indicative of a present count of acknowledged unread messages for said subscriber in a visited location register associated with said serving Mobile Switching Center.

4. The message waiting indication update feature of claim 2 wherein said message indication means comprises:

registration means, operable in a serving Mobile Switching Center and responsive to said data indicative of a present count of unread messages for said subscriber, and said data indicative of a present count of acknowledged unread messages for said subscriber indicating the presence of unread messages in excess of those identified in said present count of acknowledged unread messages for said subscriber, for transmitting data to said mobile subscriber wireless communication device indicative of a present count of unread messages for said subscriber.

5. The message waiting indication update feature of claim 4 further comprising:
registration update means, responsive to said mobile subscriber wireless communication device acknowledging receipt of said data indicative of a present count of unread messages for said subscriber, for transmitting a message to said Home Location Register means, associated with said subscriber's home Mobile Switching Center acknowledging receipt by said mobile subscriber wireless communication device of said data indicative of a present count of unread messages for said subscriber; and
register update means operable in said subscriber's home Mobile Switching Center for updating said data indicative of a present count of acknowledged unread messages for said subscriber in said Home Location Register means.

6. A message waiting indication update feature, operable in a cellular communication network for maintaining a count of the unread messages stored for a subscriber who uses a mobile subscriber wireless communication device, comprising:
storing data in a Home Location Register indicative of a present count of unread messages for said subscriber;
border condition determining means for identifying that a cell last accessed by said mobile subscriber wireless device is on a border with a Mobile Switching Center other than the serving Mobile Switching Center;
Mobile Switching Center message indication means, responsive to the presence of unread messages in excess of those identified in said present count of acknowledged unread messages for said subscriber, for transmitting data indicative of a present count of unread messages for said subscriber to said other Mobile Switching Center; and
register update means, responsive to a change in said data indicative of a present count of unread messages for said subscriber, for storing said data indicative of a present count of unread messages for said subscriber, and said data indicative of a present count of acknowledged unread messages for said subscriber in a visited location register associated with said serving Mobile Switching Center.

7. The message waiting indication update feature of claim 6 wherein said message indication means comprises:
registration means, operable in a serving Mobile Switching Center and responsive to said data indicative of a present count of unread messages for said subscriber, and said data indicative of a present count of acknowledged unread messages for said subscriber indicating the presence of unread messages in excess of those identified in said present count of acknowledged unread messages for said subscriber, for transmitting data to said mobile subscriber wireless communication device indicative of a present count of unread messages for said subscriber.

8. The system of claim 7 further comprising:
registration update means, responsive to said mobile subscriber wireless communication device acknowledging receipt of said data indicative of a present count of unread messages for said subscriber, for transmitting a message to said Home Location Register means, associated with said subscriber's home Mobile Switching Center acknowledging receipt by said mobile subscriber wireless communication device of said data indicative of a present count of unread messages for said subscriber; and
register update means operable in said subscriber's home Mobile Switching Center for said data indicative of present count of acknowledged unread messages for said subscriber in said Home Location Register means.

9. A message waiting indication update feature, operable in a cellular communication network, for maintaining a count of the unread messages stored for a subscriber who uses a mobile subscriber wireless communication device, comprising:
maintaining, in the Home Location Register associated with said subscriber's home Mobile Switching Center, a profile for said subscriber comprising a set of data that identifies said subscriber, service authorizations for said subscriber, said data indicative of a present count of unread messages for said subscriber, and data indicative of a present count of acknowledged unread messages for said subscriber;
storing data in said Home Location Register indicative of a present count of unread messages for said subscriber;
storing data in said Home Location Register indicative of a present count of acknowledged unread messages for said subscriber;
identifying that a cell last accessed by said mobile subscriber wireless device is on a border with a Mobile Switching Center other than the serving Mobile Switching Center;
transmitting, in response to the presence of unread messages in excess of those identified in said present count of acknowledged unread messages for said subscriber, data indicative of a present count of unread messages for said subscriber to said other Mobile Switching Center; and
transmitting, in response to the presence of unread messages in excess of those identified in said present count of acknowledged unread messages for said subscriber, data to said subscriber indicative of a present count of unread messages for said subscriber.

10. The message waiting indication update feature of claim 9 further comprising:
transmitting, from a sewing Mobile Switching Center and in response to said subscriber initiating a registration process from a mobile subscriber wireless communication device at said serving Mobile Switching Center, a registration request message to said Home Location Register means, associated with said subscriber's home Mobile Switching Center, and
transmitting said data indicative of a present count of unread messages for said subscriber, and said data indicative of a present count of acknowledged unread messages for said subscriber to said serving Mobile Switching Center.

11. The message waiting indication update feature of claim 10 further comprising:
storing said data indicative of a present count of unread messages for said subscriber, and said data indicative of a present count of acknowledged unread messages for said subscriber in a visited location register associated with said serving Mobile Switching Center.

12. The message waiting indication update feature of claim 10 wherein said step of transmitting message indication data comprises:

transmitting, from a serving Mobile Switching Center and in response to said data indicative of a present count of unread messages for said subscriber, and said data indicative of a present count of acknowledged unread messages for said subscriber indicating the presence of unread messages in excess of those identified in said present count of acknowledged unread messages for said subscriber, data to said mobile subscriber wireless communication device indicative of a present count of unread messages for said subscriber.

13. The message waiting indication update feature of claim 12 further comprising:

transmitting, in response to said mobile subscriber wireless communication device acknowledging receipt of said data indicative of a present count of unread messages for said subscriber, a message to said Home Location Register, associated with said subscriber's home Mobile Switching Center acknowledging receipt by said mobile subscriber wireless communication device of said data indicative of a present count of unread messages for said subscriber; and updating said data indicative of a present count of acknowledged unread messages for said subscriber in said Home Location Register.

14. A message waiting indication update feature, operable in a cellular communication network, for maintaining a count of the unread messages stored for a subscriber who uses a mobile subscriber wireless communication device, comprising:

storing data in a Home Location Register indicative of a present count of unread messages for said subscriber;

identifying that a cell last accessed by said mobile subscriber wireless device is on a border with a Mobile Switching Center other than the serving Mobile Switching Center;

transmitting, in response to the presence of unread messages in excess of those identified in said present count of acknowledged unread messages for said subscriber, data indicative of a present count of unread messages for said subscriber to said other Mobile Switching Center; and storing, in response to a change in said data indicative of a present count of unread messages for said subscriber, said data indicative of a present count of unread messages for said subscriber, and said data indicative of a present count of acknowledged unread messages for said subscriber in a visited location register associated with said serving Mobile Switching Center.

15. The message waiting indication update feature of claim 14 wherein said step of transmitting message indication data comprises:

transmitting, from a serving Mobile Switching Center and in response to said data indicative of a present count of unread messages for said subscriber, and said data indicative of a present count of acknowledged unread messages for said subscriber indicating the presence of unread messages in excess of those identified in said present count of acknowledged unread messages for said subscriber, data to said mobile subscriber wireless communication device indicative of a present count of unread messages for said subscriber.

16. The message waiting indication update feature of claim 15 further comprising:

transmitting, in response to said mobile subscriber wireless communication device acknowledging receipt of said data indicative of a present count of unread messages for said subscriber, a message to said Home Location Register, associated with said subscriber's home Mobile Switching Center acknowledging receipt by said mobile subscriber wireless communication device of said data indicative of a present count of unread messages for said subscriber; and updating said data indicative of a present count of acknowledged unread messages for said subscriber in said Home Location Register.

* * * * *